United States Patent
Hwang et al.

(10) Patent No.: US 9,538,465 B2
(45) Date of Patent: Jan. 3, 2017

(54) SENSOR NODE AND GATEWAY MUTUALLY COMMUNICATING IN WIRELESS SENSOR NETWORK

(71) Applicant: Samsung Electronics Co., Ltd., Suwon-si (KR)

(72) Inventors: Hyo Sun Hwang, Seoul (KR); Chi Sung Bae, Yongin-si (KR); Young Jun Hong, Seoul (KR); Kun Soo Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 14/339,250

(22) Filed: Jul. 23, 2014

(65) Prior Publication Data
US 2015/0139198 A1    May 21, 2015

(30) Foreign Application Priority Data
Nov. 20, 2013 (KR) .................. 10-2013-0141182

(51) Int. Cl.
| | |
|---|---|
| *H04J 3/00* | (2006.01) |
| *H04W 52/02* | (2009.01) |
| *H04W 72/04* | (2009.01) |
| *H04W 84/18* | (2009.01) |

(52) U.S. Cl.
CPC ....... *H04W 52/0203* (2013.01); *H04W 72/042* (2013.01); *H04W 84/18* (2013.01)

(58) Field of Classification Search
CPC .............. H04W 72/0413; H04W 52/0203; H04W 84/13; H04W 72/042; H04W 84/18

USPC ........................................... 370/336
See application file for complete search history.

(56) References Cited

U.S. PATENT DOCUMENTS

| | | | |
|---|---|---|---|
| 6,035,230 A | 3/2000 | Kang et al. | |
| 6,270,457 B1 | 8/2001 | Bardy | |
| 7,738,413 B2* | 6/2010 | Varaiya | H04W 40/22 340/506 |
| 2002/0013538 A1 | 1/2002 | Teller | |
| 2009/0010203 A1* | 1/2009 | Pratt, Jr. | H04L 12/66 370/328 |
| 2009/0323716 A1* | 12/2009 | Chintalapudi | H04W 74/0841 370/461 |
| 2010/0309857 A1* | 12/2010 | Kawamura | H04J 13/0059 370/329 |
| 2011/0137472 A1* | 6/2011 | Hitt | A01G 25/167 700/284 |

(Continued)

FOREIGN PATENT DOCUMENTS

| | | |
|---|---|---|
| JP | 5-168602 A | 7/1993 |
| JP | 2008-302000 A | 12/2008 |

(Continued)

*Primary Examiner* — Faisal Choudhury
(74) *Attorney, Agent, or Firm* — NSIP Law (57) ABSTRACT

A gateway and method thereof are provided to communicate with sensor nodes. The gateway includes a generator configured to generate, based on schedule information on a previous uplink interval, response data. The gateway also includes an allocator configured to allocate a subsequent uplink interval to the sensor nodes to generate schedule information on the subsequent uplink interval. The gateway includes a transmitter configured to transmit the response data and the schedule information on the subsequent uplink interval to the sensor nodes.

13 Claims, 7 Drawing Sheets

(56) References Cited

U.S. PATENT DOCUMENTS

| | | | |
|---|---|---|---|
| 2013/0033258 A1* | 2/2013 | Parr | G01B 7/14 324/207.22 |
| 2013/0336339 A1* | 12/2013 | Valiani | H04L 12/403 370/503 |
| 2013/0343202 A1* | 12/2013 | Huseth | H04W 52/0206 370/244 |
| 2014/0036728 A1* | 2/2014 | An | H04W 40/02 370/254 |
| 2014/0079051 A1* | 3/2014 | Lakkis | A61B 5/00 370/350 |
| 2014/0279600 A1* | 9/2014 | Chait | G06Q 30/018 705/317 |

FOREIGN PATENT DOCUMENTS

| | | |
|---|---|---|
| JP | 2009-537288 A | 10/2009 |
| JP | 4665284 B2 | 4/2011 |
| JP | 2011-156184 A | 8/2011 |
| JP | 2011-156320 A | 8/2011 |
| JP | 2012-34840 A | 2/2012 |
| KR | 10-0197580 B1 | 6/1999 |
| KR | 10-2006-0091187 A | 8/2006 |
| KR | 10-0868073 B1 | 11/2008 |
| KR | 10-2010-0089054 A | 8/2010 |
| KR | 10-2011-0131661 A | 12/2011 |
| KR | 10-2013-0033070 A | 4/2013 |

* cited by examiner

| Index | Sensor node ID | Modulation scheme | |
|---|---|---|---|
| 0 | ID1 | MOD1 | ~310 |
| 1 | ID1 | MOD2 | ~320 |
| 2 | ID2 | MOD1 | ~330 |
| 3 | ID2 | MOD1 | ~340 |
| 4 | ID2 | MOD1 | ~350 |
| ⋮ | ⋮ | ⋮ | |
| N-1 | IDK | MOD3 | ~360 |

SENSOR NODE AND GATEWAY MUTUALLY COMMUNICATING IN WIRELESS SENSOR NETWORK

CROSS-REFERENCE TO RELATED APPLICATION

This application claims the priority benefit under 35 U.S.C. §119(a) of Korean Patent Application No. 10-2013-0141182, filed on Nov. 20, 2013, in the Korean Intellectual Property Office, the disclosure of which is incorporated herein by reference.

BACKGROUND

1. Field

The following description relates to a sensor node and a gateway mutually communicating in a wireless sensor network.

2. Description of Related Art

A wireless sensor network may be a wireless network including sensor nodes that use sensors to monitor physical or environmental conditions. In the wireless sensor network, sensor nodes are distributed to perform wireless communication with a gateway. The gateway may collect data sensed by the sensor nodes, and process or analyze the collected data.

In general, the gateway performs wireless communication with the sensor nodes, and each of the sensor nodes operates using a battery. Accordingly, there is a desire for technology to manage power of the gateway and the sensor node.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a gateway to communicate with sensor nodes, the gateway including a generator configured to generate, based on schedule information on a previous uplink interval, response data; an allocator configured to allocate a subsequent uplink interval to the sensor nodes to generate schedule information on the subsequent uplink interval; and a transmitter configured to transmit the response data and the schedule information on the subsequent uplink interval to the sensor nodes.

The response data may indicate whether data transmitted by the sensor nodes in the previous uplink interval is received.

The response data may include a bitmap including a number of bits identical to a number of elements included in the schedule information on the previous uplink interval, and a sequence of the bits included in the bitmap corresponds to a sequence of the elements.

The schedule information on the subsequent uplink interval may include elements corresponding to time slots included in the subsequent uplink interval, and each of the elements includes an identifier (ID) of a sensor node based on a sequence by which the subsequent uplink interval is allocated to the sensor nodes.

Each of the elements may include an instructor to instruct a modulation scheme for a time slot corresponding to a corresponding element.

A number of time slots to divide the subsequent uplink interval may be determined based on a number of elements included in the schedule information on the subsequent uplink interval.

A point in time for data transmission in the subsequent uplink interval may be determined based on an index of an element included in the schedule information on the subsequent uplink interval.

The generator may include a processor configured to verify, with respect to time slots included in the previous uplink interval, whether the data is received from a sensor node, and configured to set a bit, which corresponds to a time slot receiving data among bits included in the response data, to be a first logic value, and set another bit corresponding to a time slot not receiving data.

The transmitter may transmit to the sensor nodes a synchronization signal including the response signal and the schedule information on the subsequent uplink interval.

The gateway may also include a processor configured to determine, based on cumulative data received from the sensor nodes after converting from a sleep mode to an active mode, whether the active mode is to be converted into the sleep mode, wherein the gateway operates in a low power mode in the sleep mode.

The allocator may allocate the subsequent uplink interval to a sensor node selected based on at least one of a quantity of sensing data, whether data retransmission is required, and an amount of power consumption.

The response data may include an identical data structure irrespective of a number of sensor nodes allocated to the previous uplink interval.

In response to a data structure of the response data being related to a data structure of the schedule information, the response data may include a small size bitmap.

In accordance with an illustrative example, there is provided a sensor node, including: an extractor configured to extract schedule information from a subsequent uplink interval and response data included in a synchronization signal; a verifier configured to verify, based on the response data and schedule information on a previous uplink interval, whether data transmitted in the previous uplink interval is retransmitted; and a transmitter configured to transmit data to a gateway based on the schedule information on the subsequent uplink interval and a result of the verifying.

The sensor node may also include a receiver configured to receive the synchronization signal from the gateway.

The verifier may acquire an index of an element allocated to the sensor node among elements included in the schedule information on the previous uplink interval, and verify whether the data is retransmitted, based on a bit corresponding to the index among the bits included in the response data.

The transmitter may acquire an index of an element allocated to the sensor node among elements included in the schedule information on the subsequent uplink interval, and transmit data to the gateway at a point in time for transmission corresponding to the index.

The transmitter may detect an element allocated to the sensor node from among elements included in the schedule information on the subsequent uplink interval, and modulate data based on a modulation scheme included in the detected element.

The sensor node may also include a processor configured to determine whether an active mode is to be converted into a sleep mode, based on at least one of the synchronization signal and cumulative data transmitted to the gateway after the sleep node is converted into the active mode, wherein the sensor node operates at a low power mode in the sleep mode.

In accordance with an illustrative example, there is provided a method of a gateway to communicate with sensor nodes, the method including: generating, based on schedule information on a previous uplink interval, response data; allocating a subsequent uplink interval to the sensor nodes to generate schedule information on the subsequent uplink interval; and transmitting the response data and the schedule information on the subsequent uplink interval to the sensor nodes.

Other features and aspects may be apparent from the following detailed description, the drawings, and the claims.

BRIEF DESCRIPTION OF THE DRAWINGS

These and/or other aspects will become apparent and more readily appreciated from the following description of example embodiments, taken in conjunction with the accompanying drawings of which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
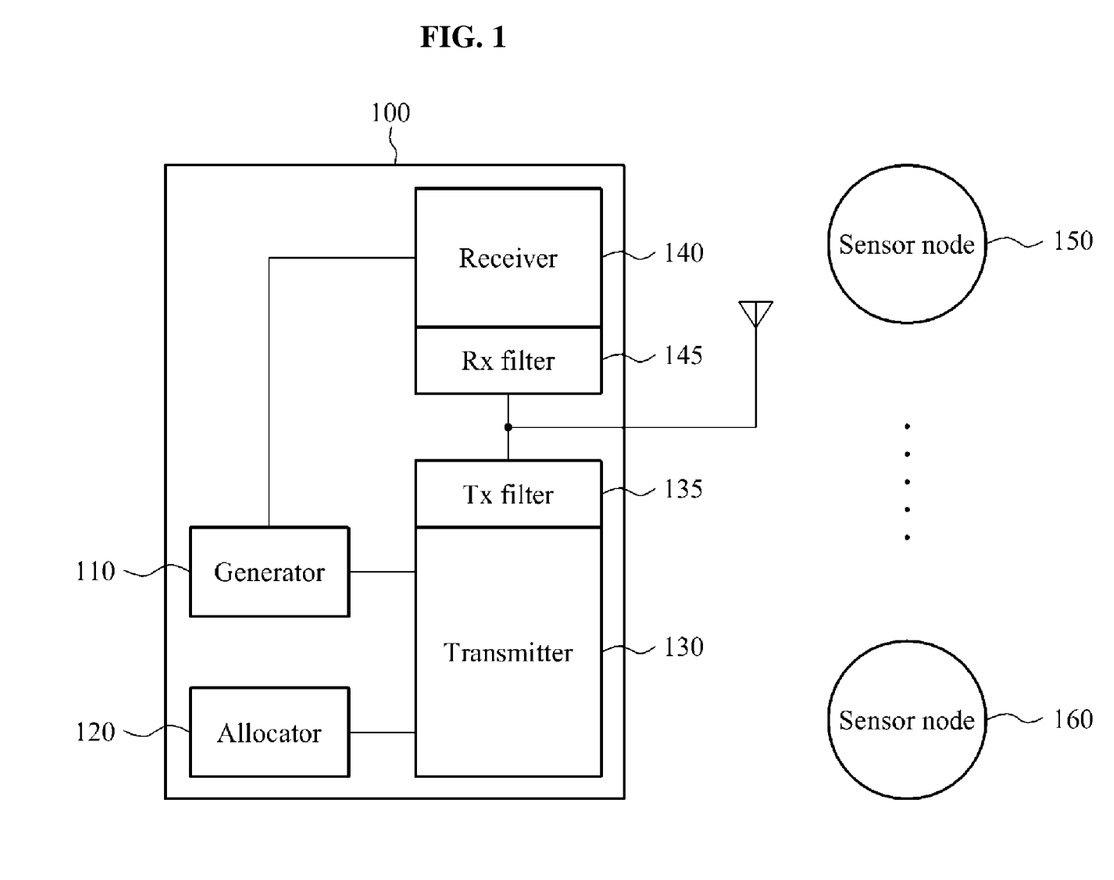
FIG. 1 illustrates a gateway, in accord with an embodiment.

FIG. 1 illustrates a gateway 100, in accord with an embodiment. Referring to FIG. 1, the gateway 100 communicates with a plurality of sensor nodes 150 and 160. The gateway 100 and the plurality of sensor nodes 150 and 160 may communicate, in one example, through a wireless sensor network. The sensor nodes 150 and 160 sense various ambient conditions, for example, a temperature, a sound, and a pressure, and transmit the sensed data to a gateway. The sensor nodes 150 and 160 may be implemented in various configurations. For example, the sensor nodes 150 and 160 are configured to be attached to a skin, are configured to have a body wearable form, or are configured to be inserted into a body and may be used in a system to measure a biosignal. The gateway collects the sensing data transmitted from the plurality of sensor nodes. The gateway 100 transmits the collected sensing data to a device, for example, an external server. The gateway 100 may be a gateway sensor node. The gateway sensor node performs a function of a sensor node and also functions as a gateway. The gateway 100 may be implemented in various forms such as a smartphone, a tablet personal computer (PC), a wearable device, and the like.

The wireless sensor network is applied to measure a bio-signal, and collect, store, and analyze the measured biosignal, thereby monitoring health conditions in real time. The wireless sensor network is configured to a system to diagnose and prevent a disease by analyzing a collected biosignal. As an example, in a daily life of a user, sensor nodes included inside or outside a body of the user may constantly sense various biosignals. The sensor nodes transmit the sensing data to the gateway, and the gateway transmits the collected sensing data to a server. Based on the sensing data collected at the gateway, the user may independently diagnose a health condition, and receive, from the server, results of a health examination provided by an expert.

Depending on a case, data not corresponding to the sensing data may also be transmitted from the sensor node to the gateway. For example, event data of a capacity less than that of the sensing data may be transmitted from the sensor node to the gateway. The event data may include event information extracted from the sensing data. Alternatively, various forms status information data associated with, for example, a sensor state, battery remains, a wireless channel state are transmitted from the sensor node to the gateway. As used hereinafter, "data" or "data packet" may be understood as a concept comprehensively including various types of uplink data transmitted from the sensor node to the gateway.

For increased convenience of a user, the sensor nodes and the gateway may operate using a battery. The sensor node and the gateway may wirelessly communicate with each other. In some embodiments, technology to reduce power for use in wireless communication between the sensor node and the gateway may be provided.

Figure 2:
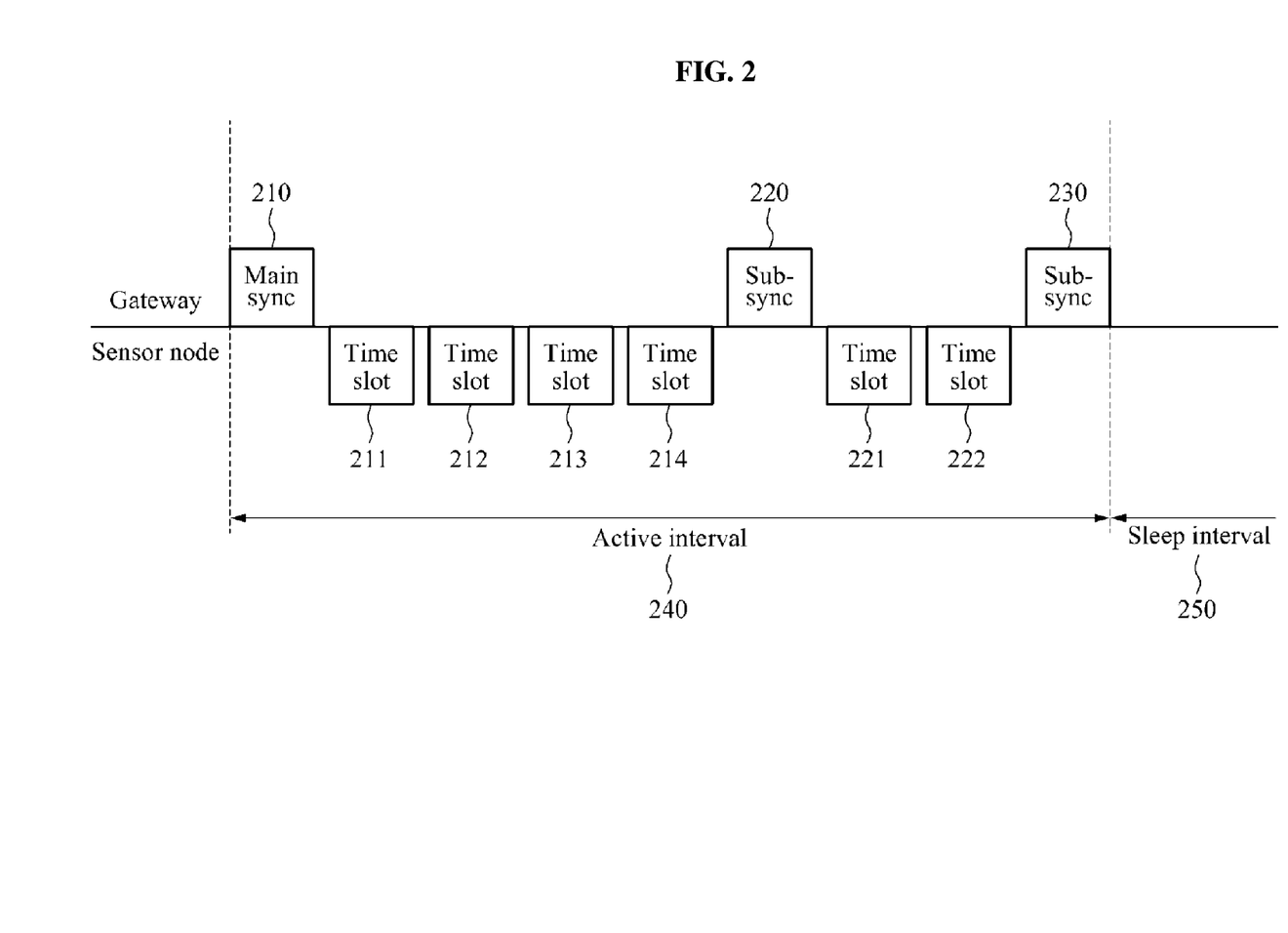
FIG. 2 illustrates a framework for data transmission, in accord with an embodiment.

Referring to FIG. 2, a sensor node and a gateway, according to an embodiment, communicate with each other based on a framework for data transmission. For increased ease and convenience, descriptions about a case in which a gateway communicates with a single sensor node are provided with reference to FIG. 2. Descriptions about a case in which a gateway communicates with a plurality of sense nodes are provided with reference to FIGS. 3 through 6.

The framework for data transmission includes an active interval 240 and a sleep interval 250. In the active interval 240, the gateway and the sensor node communicate with each other. In the sleep interval 250, the gateway and the sensor node operate in a low power mode. Hereinafter, operation modes of the gateway and the sensor node in the active interval 240 may also be referred to as an active mode, and operation modes of the gateway and the sensor node in the sleep interval 250 may also be referred to as a sleep mode. In the active mode, the gateway and the sensor node may also temporarily operate in the low power mode based on a rule of a transmitted and received data packet.

A sync packet may be used to synchronize the gateway and the sensor node. As used herein, the terms "sync", "sync packet" and "synchronization signal" may be interchangeable. The sync packet may be periodically transmitted by the gateway, and divided into a main sync and a sub-sync based on a usage of the sync.

When the sleep mode is converted into the active mode, the gateway transmits a main sync 210 to the sensor node. The gateway and the sensor node are mutually synchronized using the main sync 210. The main sync 210 includes schedule information on an uplink interval. The uplink interval is a time interval during which the sensor node transmits data to the gateway. The gateway divides the uplink interval into time slots 211, 212, 213, and 214, and allocates the divided time slots 211, 212, 213, and 214 to the sensor node. The schedule information includes information on, for example, a sensor node to which each time slot is allocated, a time at which the sensor node transmits data, a modulation scheme through which the sensor node modulates the data, and other similar information. The sensor node transmits to the gateway the data at a predetermined time using a predetermined modulation scheme based on the schedule information included in the main sync 210. For example, as illustrated in FIG. 2, because the gateway communicates with the single sensor node, the time slots 211, 212, 213, and 214 are allocated to an identical sensor node. The sensor node transmits to the gateway the data in the time slots 211, 212, 213, and 214 allocated to the sensor node.

The gateway receives the data transmitted from the sensor node in the time slots 211, 212, 213, and 214, and generates a sub-sync 220 based on the received data. The sub-sync 220 includes response data indicating whether data transmitted in a previous uplink interval is received. In one example, the previous uplink interval is an uplink interval occurring at an earlier point in time at which the gateway generates the sub-sync 220. For example, the time slots 211, 212, 213, and 214 may be previous uplink intervals relative to a point in time at which the sub-sync 220 is generated.

Similar to the main sync 210, the sub-sync 220 includes schedule information on an uplink interval. A subsequent uplink interval is an uplink interval occurring subsequent to the point in time at which the sub-sync 220 is generated. For example, time slots 221 and 222 are a subsequent uplink interval relative to the point in time at which the sub-sync 220 is generated. The gateway divides the subsequent uplink interval into the time slots 221 and 222, and allocates the divided time slots 221 and 222 to the sensor node.

The sensor node transmits to the gateway data using a time slot allocated to the sensor node based on the schedule information included in the sub-sync 220. In this example, based on the response data included in the sub-sync 220, the sensor node verifies whether data transmitted in the previous uplink interval is successfully received at the gateway. When a result of the verifying indicates that the data transmitted by the sensor node is not successfully received at the gateway, the sensor node retransmits existing data using the time slot allocated to the sensor node. When the result of the verifying indicates that the data transmitted by the sensor node is successfully received at the gateway, the sensor node transmits new data using the time slot allocated to the sensor node.

When the gateway verifies that a sufficient quantity of data is received during the active interval 240, the gateway transmits to the sensor node a sub-sync 230 indicating that the active mode is to be converted into the sleep mode. In response to the gateway transmitting the sub-sync 230 to the sensor node, the active mode is converted into the sleep mode. In response to the sensor node receiving the sub-sync 230, the active mode is converted into the sleep mode.

Figure 3:
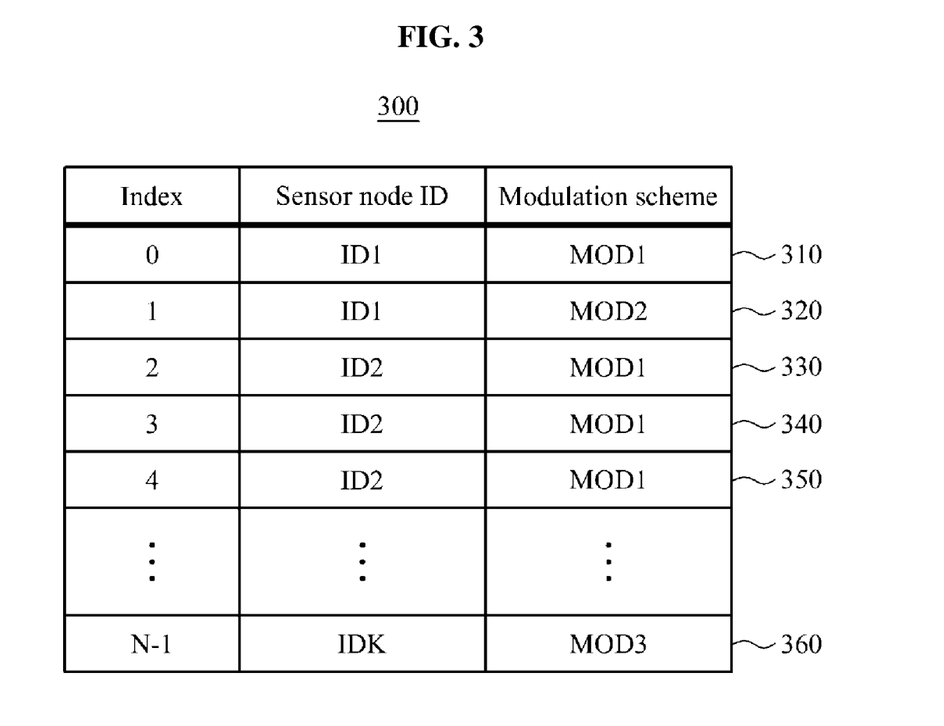
FIG. 3 illustrates an example of schedule information, in accord with an embodiment.

Hereinafter, descriptions of various configurations of a gateway communicating with sensor nodes will be provided with reference to FIGS. 3 through 7. Referring to FIG. 3, schedule information 300, according to an example, includes a predetermined data structure. The gateway generates the schedule information 300 based on a result obtained by allocating a subsequent uplink interval to the sensor nodes.

The gateway divides the subsequent uplink interval into time slots. The gateway generates the schedule information 300 including a number of elements identical to a number of time slots. For example, the gateway may divide the subsequent uplink interval into N time slots, N being a positive integer. In this case, the schedule information 300 includes N elements, for example, an element 310, an element 320, an element 330, an element 340, an element 350, and an element 360.

The N elements correspond to N time slots included in the subsequent uplink interval. For example, the element 310 corresponds to a first time slot among the N time slots included in the subsequent uplink interval, and the element 320 corresponds to a second time slot among the N time slots included in the subsequent uplink interval. The element 360 corresponds to an Nth time slot among the N time slots included in the subsequent uplink interval. As an example, the element 310 corresponds to an Nth time slot among N time slots included in the subsequent uplink interval, and the element 320 corresponds to an (N−1)th time slot among the N time slots included in the subsequent uplink interval. The element 360 corresponds to a first time slot among the N time slots included in the subsequent uplink interval. As described above, elements corresponding to time slots may be transformed in various patterns. Hereinafter, a description of a first case in which elements sequentially correspond to time slots will be described for increased clarity and convenience.

The gateway allocates the N divided time slots to the sensor nodes. The gateway records allocation information on the N elements. For example, the gateway allocates a first time slot and a second time slot to a first sensor node. In this case, the gateway records a first sensor node identifier (ID1) on a sensor node identifier (ID) field of the element 310 corresponding to the first time slot. The gateway records a first sensor node identifier (ID1) on a sensor node identifier (ID) field of the element 320 corresponding to the second time slot. The gateway allocates a third time slot, a fourth time slot, and a fifth time slot to the second sensor node. In this case, the gateway records a second sensor node ID (ID2) on a sensor node ID field of the element 330 corresponding to the third time slot. The gateway records the ID2 on a sensor node ID field of the element 340 corresponding to the fourth time slot and a sensor node ID field of the element 350 corresponding to the fifth time slot. Also, the gateway allocates the Nth time slot to a Kth sensor node. In one illustrative example, K is a positive integer. In an example, the gateway records a Kth sensor node ID (IDK) on a sensor node ID field of the element 360 corresponding to the Nth time slot.

Elements included in the schedule information 300 include an ID of a sensor node based on a sequence by which a subsequent uplink interval is allocated to the sensor nodes. In one example, the sequence by which the subsequent uplink interval is allocated to the sensor nodes is a sequence determined to transmit data in the subsequent uplink interval by the sensor nodes. For example, a sequence by which a subsequent uplink interval is allocated to sensor nodes may be expressed to be "1-1-2-2-2- . . . -K". In a sensor node ID field of each of the elements included in the schedule information 300, "1-1-2-2-2- . . . -K" may be recorded in an ascending direction of an index.

The sensor nodes receives the schedule information 300 from the gateway, and extracts uplink resources allocation information from the schedule information 300. The sensor nodes verify a number of time slots to divide the subsequent uplink interval based on a number of elements included in the schedule information 300. As an example, because N elements are included in the schedule information 300, the sensor nodes verify that N time slots are provided to divide the subsequent uplink interval.

Based on the sensor node ID field of the schedule information 300, each sensor node detects an element in which a corresponding ID is recorded for each sensor node. Each of the sensor nodes verifies a point in time for data transmission based on an index of the detected element. For example, the first sensor node detects the element 310 and the element 320. An index of the element 310 may be "0", and an index of the element 320 may be "1". Thus, the first sensor node recognizes that the first time slot and the second time slot are allocated to the first sensor node. Also, the second sensor node detects the element 330, the element 340, and the element 350. An index of the element 330 may be "2", an index of the element 340 may be "3", and an index of the element 350 may be "4". Thus, the second sensor node recognizes that the third time slot, the fourth time slot, and the fifth time slot are allocated to the second sensor node. Also, the K sensor node may detect the element 360. Because an index of the element 360 is "N−1", the Kth sensor node may recognize that the Nth time slot is allocated to the Kth sensor node In an example, the time slots included in the subsequent uplink interval have a predetermined duration. For example, a duration of a time interval for each of the time slots may be identical. When the gateway and the sensor nodes are aware of a predetermined duration for each time interval, the sensor nodes calculate a point in time for data transmission based on a sequential number of a time slot allocated to each of the sensor nodes. In example embodiments, a duration of the subsequent uplink interval may be determined in advance. In this case, each of the time slots included in the subsequent uplink interval have identical time interval durations. For example, a duration of the subsequent uplink interval may be determined in advance and the subsequent uplink interval may be equally divided by the time slots. When the gateway and the sensor nodes are aware of a predetermined duration of the subsequent uplink interval, the sensor nodes calculate a duration of each time slot based on a number of elements included in schedule information. The sensor nodes calculate a point in time for data transmission based on the calculated duration of time slot and a sequential number of a time slot allocated to each of the sensor nodes.

The gateway determines a modulation scheme for data transmission in each time slot. The gateway stores the determined modulation scheme in each time slot on the schedule information 300. For example, the gateway determines a first modulation scheme to be used in the first time slot, the third time slot, the fourth time slot, and the fifth time slot. In this case, the gateway stores an instructor, for example, an MOD 1 instructing the first modulation scheme to allocate each modulation scheme field of the element 310 corresponding to the first time slot, the element 330 corresponding to the third time slot, the element 340 corresponding to the fourth time slot, and the element 350 corresponding to the fifth time slot. The gateway determines a second modulation scheme is to be used in the second time slot. In this case, the gateway stores an instructor, for example, an MOD2 instructing the second modulation scheme to allocate a modulation scheme field of the element 320 corresponding to the second time slot. The gateway may determine a third modulation scheme to be used in the Nth time slot. In this case, the gateway stores an instructor, for example, an MOD3 instructing the third modulation scheme to allocate a modulation scheme field of the element 360 corresponding to the Nth time slot.

Each of the sensor nodes detects an element in which an ID of each of the sensor nodes is present, based on a corresponding sensor node ID of the schedule information 300, and determines the modulation scheme based on the instructor recorded on a modulation scheme field of the detected element.

Figure 4:
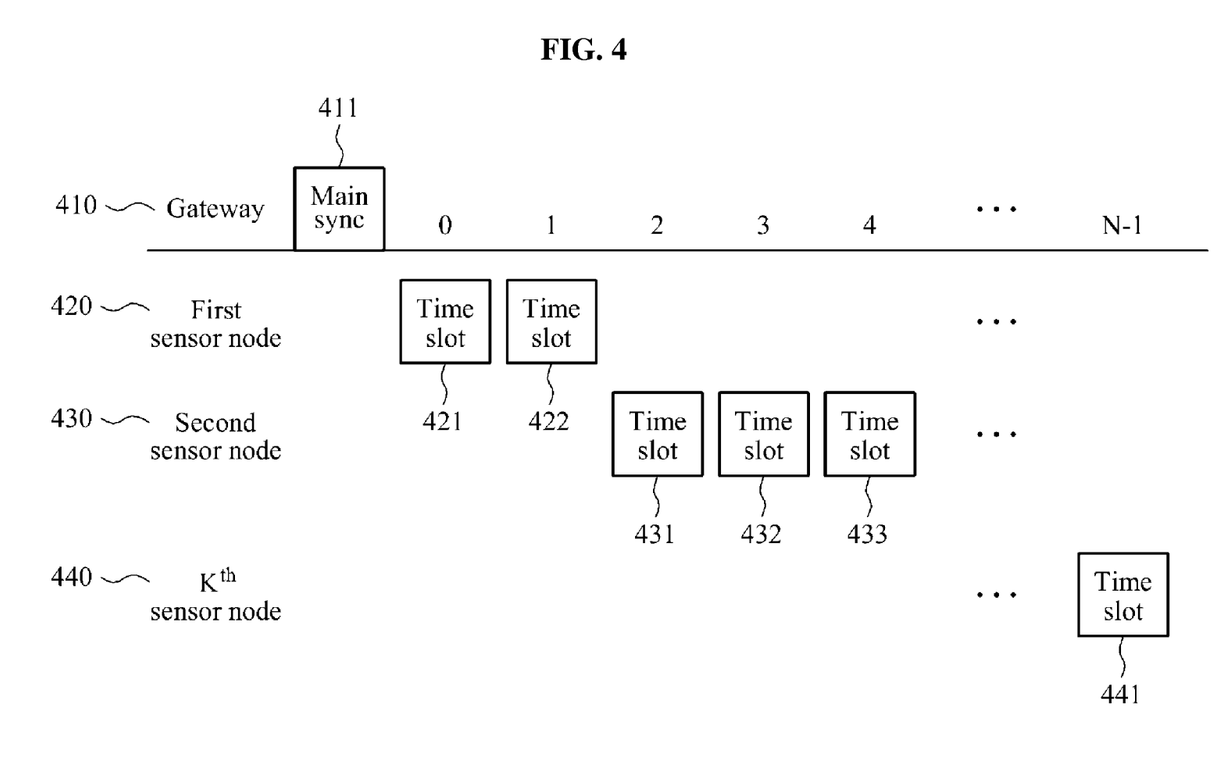
FIG. 4 illustrates a main sync allocating uplink to a plurality of sensor nodes, in accord with an embodiment.

Referring to FIG. 4, a gateway 410 transmits a main sync 411 including the schedule information 300 of FIG. 3 to sensor nodes, for example, a first sensor node 420, a second sensor node 430, and a Kth sensor node 440. The sensor nodes transmit data to the gateway 410 using a time slot allocated to the sensor nodes, based on the schedule information 300. For example, the first sensor node 420 transmits data to the gateway 410 using a time slot 421 and a time slot 422. The second sensor node 430 transmits data to the gateway using a time slot 431, a time slot 432, and a time slot 433. The Kth sensor node 440 transmits data to the gateway 410 using a time slot 441.

Figure 5:
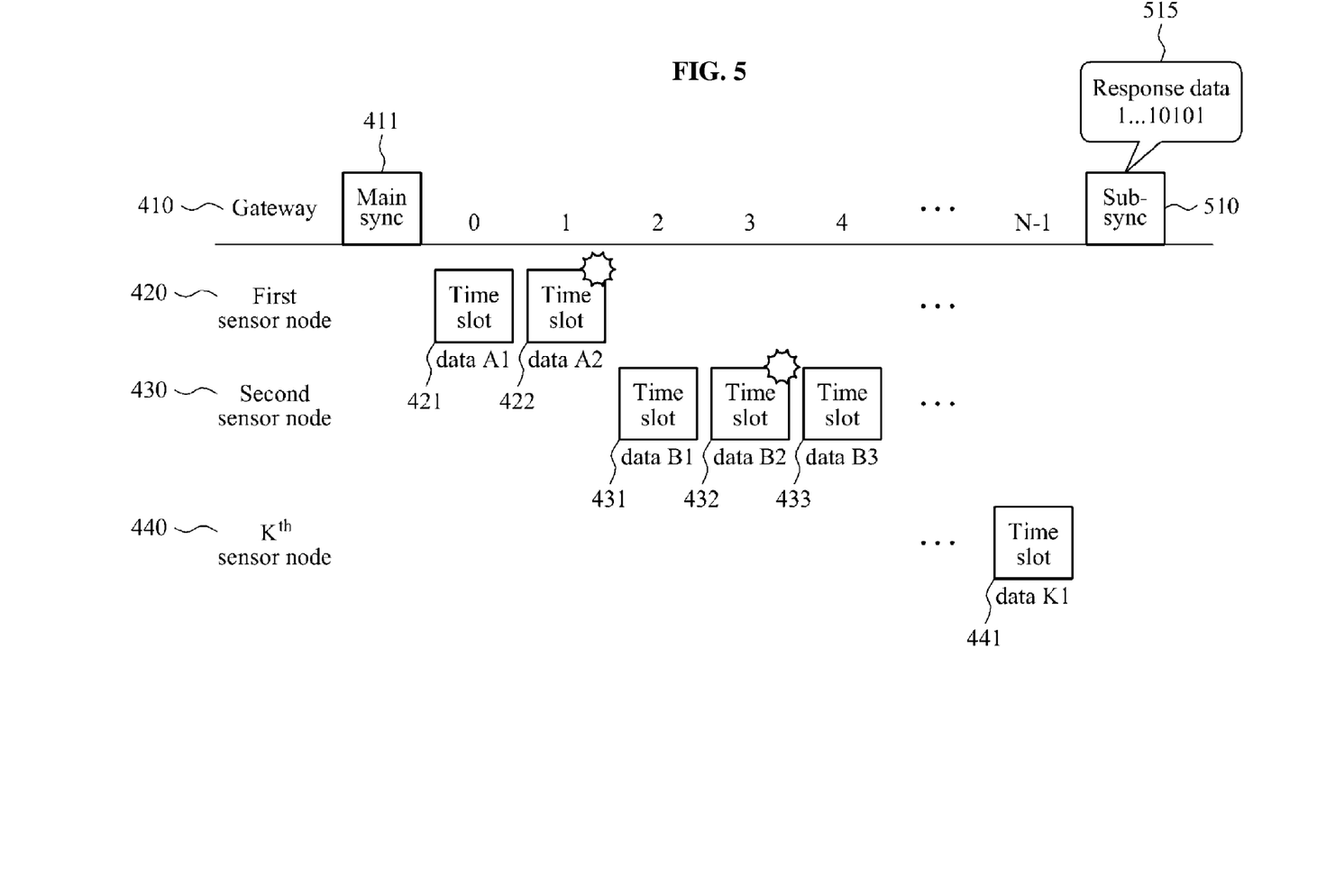
FIG. 5 illustrates a sub-sync providing a response to a plurality of sensor nodes indicating whether data is received, in accord with an embodiment.

Referring to FIG. 5, the gateway 410, according to an embodiment, generates response data 515 indicating whether data transmitted in a previous uplink interval is received. To enhance transmission reliability, the response data 515 may be generated using a group acknowledgement (ACK) scheme based on a positive ACK. In one example, the positive ACK is indicative of response information explicitly indicating whether the data is successfully received, and the group ACK is indicative of response information of the sensor nodes. For example, the response data 515 has a data structure explicitly indicating to the sensor nodes whether the data is successfully received. By transmitting the group ACK based on the response data 515 having the data structure, the gateway and the sensor nodes are simply configured, and an ACK processing time is shortened. Also, by minimizing a quantity of a sync transmitted from the gateway to the sensor nodes, power consumption of the gateway and the sensor nodes is minimized.

The data structure of the response data 515 is related to a data structure of the schedule information 300. For example, the response data 515 includes a bitmap having a number of bits identical to a number of elements included in the schedule information 300 on the previous uplink interval. Because N elements are included in the schedule information 300, N bits are included in the bitmap configuring the response data 515.

Also, a sequence of the bits included in the bitmap configuring the response data 515 may correspond to a sequence of the elements included in the schedule information 300 on the previous uplink interval. For example, the bits included in the bitmap correspond to the elements included in the schedule information 300 based on a sequence of an index. As an example, a first bit of the bitmaps configuring the response data 515 corresponds to the element 310 indicating a first element of the schedule information 300. The first bit of the bitmap configuring the response data 515 indicates whether data is received in the time slot 421 corresponding to the element 310. Also, a second bit of the bitmap configuring the response data 515 corresponds to the element 320 indicating a second element of the schedule information 300. The second bit of the bitmap configuring the response data 515 indicates whether the data is received in the time slot 422 corresponding to the element 320 is received. Similarly, an Nth bit of the bitmap configuring the response data 515 corresponds to an Nth element, for example, the element 360 included in the schedule information 300. The Nth bit of the bitmap configuring the response data 515 indicates whether the data is received in the time slot 441 corresponding to the element 360.

When the data is not successfully received at the gateway 410 in the time slot 422 and the time slot 432, the gateway 410 sets a second bit indicating whether the data is received in the time slot 422 and a fourth bit indicating whether the data is received in the time slot 432, to be "0". Other bits may be set to be "1" because the data is successfully received at the gateway 410 in other time slots. In this case, the response data 515 may be "1 . . . 10101". In the preceding example, the response data 515 is configured based on a least significant bit (LSB) sequence. However, the response data 515 may also be configured based on a most significant bit (MSB) sequence. When the MSB sequence is used, the response data 515 may be "10101 . . . 1".

When the data structure of the response data 515 is related to the data structure of the schedule information, the response data 515 includes a bitmap of a relatively small size. Also, the response data 515 may have an identical data structure irrespective of a number of sensor nodes allocated to the previous uplink interval.

Figure 6:
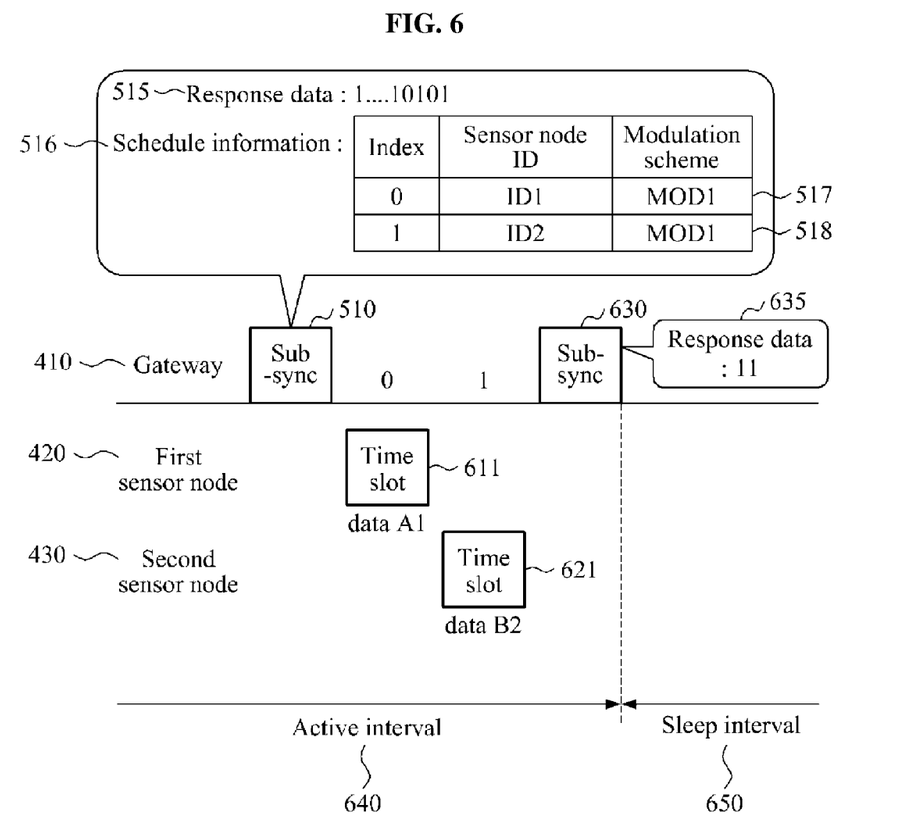
FIG. 6 illustrates an operation of a plurality of sensor nodes receiving a sub-sync, in accord with an embodiment.

The gateway 410 transmits a sub-sync 510 including the response data 515 to the sensor nodes. Referring to FIG. 6, the sub-sync 510 includes the response data 515 and schedule information 516 on a subsequent uplink interval. The schedule information 516 on the subsequent uplink interval is generated to be similar to the schedule information 300 on the previous uplink interval. In practice, the schedule information 516 on the subsequent uplink interval has a data structure identical to that of the schedule information 300 of FIG. 3. The schedule information 516 on the subsequent uplink interval includes elements 517 and 518, each corresponding to time slots 611 and 621 obtained by dividing the subsequent uplink interval. Each of the elements 517 and 518 include an ID of a sensor node to which the plurality of time slots 611 and 621 are allocated. Also, each of the elements 517 and 518 include an instructor of a modulation scheme used in each of the time slots 611 and 621.

The first sensor node 420 receives the sub-sync 510, and extracts the response data 515 from the sub-sync 510. Because the first sensor node 420 detects an element including an ID of the first sensor node 420 from the schedule information 300 on the previous uplink interval, a value of a bit corresponding to an index of the detected element among bits included in the response data 515 may be identified. For example, the first sensor node 420 detects the element 310 of an index 0 and the element 320 of an index 1 from the schedule information 300 of FIG. 3. The first sensor node 420 identifies a bit 0 of the response data 515 based on an LSB sequence. Because the bit 0 corresponds to "1", the first sensor node 420 recognizes that data, for example, dataA1 transmitted from the time slot 421 of FIG. 5 is successfully received at the gateway. Also, the first sensor node 420 identifies a bit 1 of the response data 515. Because the bit 1 of the response data 515 corresponds to "0", the first sensor node 420 recognizes that data, for example, dataA2 transmitted from the time slot 422 of FIG. 5 is not successfully received at the gateway.

The first sensor node 420 extracts the schedule information 516 from the sub-sync 510. Because an index of the element 517 having an ID1 indicating an ID of the first sensor node 420 in the schedule information 516 is "0", the first sensor node 420 transmits data using the time slot 611.

In this example, the first sensor node 420 transmits the dataA2 required to be retransmitted.

Because the second sensor node 430 detects an element including an ID of the second sensor node 430 from the schedule information 300 on the previous uplink interval, a value of a bit corresponding to an index of the detected element among bits included in the response data 515 is identified. For example, the second sensor node 430 detects the element 330 of an index 2, the element 340 of an index 3, and the element 350 of an index 4 from the schedule information 300 of FIG. 3. The second sensor node 430 identifies a bit 2 of the response data 515 based on the LSB sequence. Because the bit 2 corresponds to "1", the first second node 430 recognizes that data, for example, dataB1 transmitted from the time slot 431 of FIG. 5 is successfully received at the gateway. In addition, the second sensor node 430 identifies a bit 3 of the response data 515. Because the bit 3 of the response data 515 corresponds to "0", the second sensor node 430 recognizes that data, for example, dataB2 transmitted from the time slot 432 of FIG. 5, is not successfully received at the gateway. Also, the second sensor node 430 identifies a bit 4 of the response data 515. Because the bit 4 of the response data 515 corresponds to "1", the second sensor node 430 recognizes that data, for example, dataB3 transmitted from the time slot 433 of FIG. 5 is successfully received at the gateway.

The second sensor node 430 extracts the schedule information 516 from the sub-sync 510. Because an index of the element 518 having an ID2 indicating an ID of the second sensor node 430 in the schedule information 516 is "1", the second sensor node 430 transmits data using the time slot 621. In this example, the second sensor node 430 gives preference to transmitting the dataB2 because retransmission is required.

In response to the gateway verifying that a sufficient quantity of data is collected in an active interval 640, the gateway transmits to the sensor nodes a sub-sync 630 indicating that an active mode is to be converted into a sleep mode. The sub-sync 630 indicating that the active mode is to be converted into the sleep mode may be implemented in various patterns. For example, the sub-sync 630 may include response data 635, in addition to schedule information. The gateway 410 may be converted from the active mode to the sleep mode after the sub-sync 630 is transmitted. Also, the sensor nodes may be converted from the active mode to the sleep mode after the sub-sync 630 is received. The gateway 410 and the sensor nodes may operate in a low power mode in a sleep interval 650.

To minimize a length of the active interval 640 and maximize a length of the sleep interval 650, the gateway 410 may give preference to allocating uplink resources to a predetermined sensor node. For example, the gateway 410 allocates uplink resources to a sensor node having a relatively large quantity of sensing data. The gateway 410 may also allocate the uplink resources to a sensor node of which data is to be retransmitted. The gateway 410 may also give preference to transmitting the uplink resources to a sensor node in which a relatively large amount of power is used.

Although the foregoing illustrative examples previously described include a gateway that divides an uplink interval based on a time division scheme, the gateway may also divide the uplink interval based on a frequency division scheme. In this case, a time slot may be replaced to be a frequency slot. The gateway and sensor nodes may previously recognize whether the uplink interval is divided based on the time division scheme or based on the frequency division scheme. When the uplink interval is divided based on the frequency division scheme, response data and schedule information may have an identical data structure. In one example, the gateway generates the response data and the schedule information using a same process, and the sensor nodes may extract uplink resources allocation information from the schedule information using an identical method. Also, the sensor nodes may verify whether retransmission is required, based on the response data in a same process.

Referring back to FIG. 1, the gateway 100 includes a generator 110, an allocator 120, and a transmitter 130. The gateway 100 also includes a receiver 140. The receiver 140 receives data transmitted from the sensor nodes in a previous uplink interval. The generator 110 generates response data indicating whether the data transmitted from the sensor nodes in the previous uplink interval is received. The generator 110 generates the response data based on schedule information on the previous uplink interval. For example, the response data may include a bitmap having a number of bits identical to a number of elements included in the schedule information on the previous uplink interval. A sequence of the bits included in the bitmap configuring the response data correspond to a sequence of the elements included in the schedule information. A structure of the bitmap configuring the response data may be expressed based on a data packet transmission sequence indicated in the schedule information on the previous uplink interval. The generator 110 includes a processor to verify, with respect to the plurality of time slots included in the previous uplink interval, whether data is successfully received from a sensor node to which a time slot is allocated. The processor also sets a bit corresponding to a time slot successfully receiving data among a plurality of bits included in the response data, to be a first logic value. The processor also sets a bit corresponding to a time slot not successfully receiving data among the plurality of bits included in the response data. Although the generator 110 is described to include the processor, an alternative configuration may be to configure the processor to be separate from the generator 110.

The allocator 120 allocates a subsequent uplink interval to the sensor nodes. The allocator 120 records allocation information on schedule information on the subsequent uplink interval. The transmitter 130 transmits the response data and the schedule information on the subsequent uplink interval to the sensor nodes. In accordance with an embodiment, by pending response data indicating whether a data packet of a previous uplink interval is received, the schedule information on the subsequent uplink interval is transmitted along with the response data.

The receiver 140 and the transmitter 130 may be implemented using an identical antenna. In such a case, the receiver 140 includes an Rx filter 145 and the transmitter 130 includes a Tx filter 135. Alternatively, the gateway 100 includes a separate duplexer module including the Rx filter 145 and the Tx filter 135.

Figure 7:
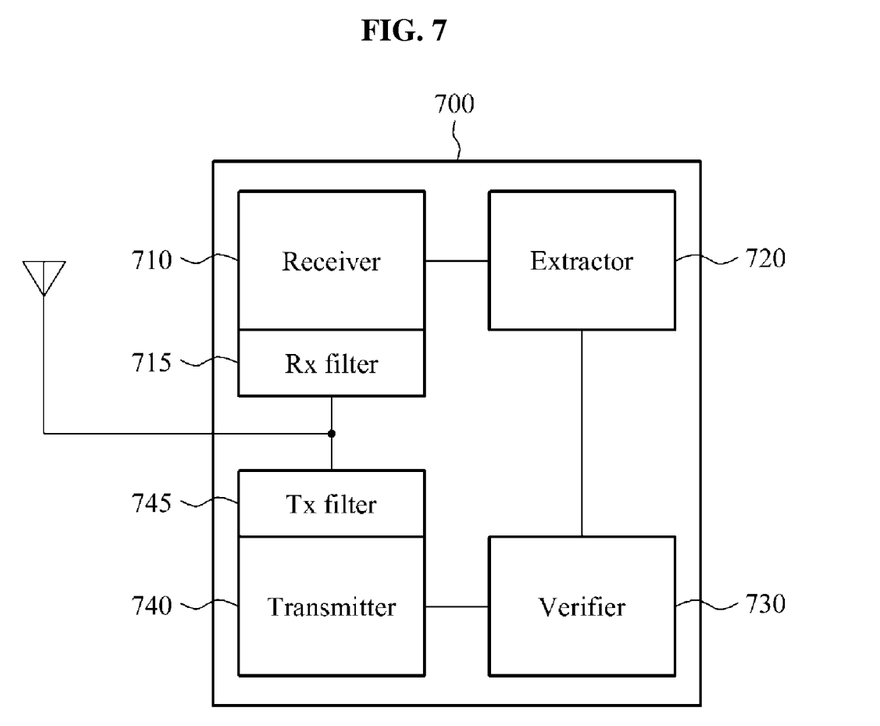
FIG. 7 illustrates a sensor node, in accord with an embodiment.

Referring to FIG. 7, a sensor node 700, according to an illustrative example, includes a receiver 710, an extractor 720, a verifier 730, and a transmitter 740. The receiver 710 receives a synchronization signal transmitted from a gateway. The receiver 710 may receive the synchronization signal using an Rx filter 715. The synchronization signal may be a main sync or a sub-sync. The extractor 720 extracts schedule information on a subsequent uplink interval and response data included in the synchronization signal. The verifier 730 verifies whether data is retransmitted, based on response data. The verifier 730 also verifies retransmission of data not successively received at the gateway among data transmitted in the previous uplink interval. For example, the verifier 730 acquires an index of an element allocated to the verifier 730 among elements included in the schedule information on the previous uplink interval. The verifier 730 verifies whether the retransmission is performed, based on a value of a bit corresponding to the acquired index among bits included in the response data.

The transmitter 740 transmits data based on the schedule information on the subsequent uplink interval extracted at the extractor 720 and a result of the verifying whether data is retransmitted. For example, the transmitter 740 acquires an index of an element allocated to the transmitter 740 among elements included in the schedule information on the subsequent uplink interval. The transmitter 740 transmits data at a point in time for transmission corresponding to the acquired index. Also, the transmitter 740 detects the element allocated to the transmitter 740 from among the elements included in the schedule information on the subsequent uplink interval. The transmitter 740 modulates data using a modulation scheme included in the detected element. The transmitter 740 transmits the data using a Tx filter 745.

The sensor node 700 may also include a processor to determine whether an active mode is to be converted into a sleep mode. The processor at the sensor node 700 determines whether conversion is to be performed, in response to a synchronization signal transmitted from the gateway. Alternatively, the processor determines whether the conversion is to be performed, based on cumulative data transmitted to the gateway after the sleep mode is converted into the active mode. For example, the processor determines whether the conversion is to be performed, based on a result obtained by verifying that a sufficient quantity of data is transmitted after the sleep mode is converted into the active mode. Although the sensor node 700 is described to include the processor, an alternative configuration may be to configure the processor to be separate from the sensor node 700.

The receiver, the transmitter, the generator, the allocator, the verifier, and the extractor described herein are implemented using hardware components. For example, the hardware components may include processors, controller, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A gateway to communicate with sensor nodes, the gateway comprising:
   a processor configured to
   determine, with respect to a time slot included in a previous uplink interval, whether data is received from a sensor node corresponding to the time slot;
   generate, based on previous schedule information on the previous uplink interval, response data,
   wherein, upon determining that the data is received, the processor is configured to set a bit corresponding to the sensor node among a set of bits included in the response data to be a first logic value, and
   wherein, upon determining that the data is not received, the processor is configured to set the bit to be a second logic value; and
   generate subsequent schedule information about a subsequent uplink interval, the subsequent schedule information comprising elements in the subsequent uplink interval allocated to the sensor nodes; and
   a transmitter configured to transmit the response data and the subsequent schedule information to the sensor nodes,
   wherein the response data comprises the set of bits, each bit corresponding to a sensor node that transmitted data in the previous uplink interval.

2. The gateway of claim 1, wherein the response data indicates whether data transmitted by the sensor nodes in the previous uplink interval is received.

3. The gateway of claim 1, wherein a number of the bits in the response data is identical to a number of elements included in the previous schedule information, and a sequence of the bits corresponds to a sequence of the elements included in the previous schedule information.

4. The gateway of claim 1, wherein the elements of the subsequent schedule information correspond to time slots included in the subsequent uplink interval, and each of the elements comprises an identifier (ID) of a sensor node based on a sequence by which the subsequent uplink interval is allocated to the sensor nodes.

5. The gateway of claim 4, wherein each of the elements comprises an instructor to instruct a modulation scheme for a time slot corresponding to a corresponding element.

6. The gateway of claim 1, wherein a number of time slots to divide the subsequent uplink interval into is determined based on a number of the elements included in the subsequent schedule information.

7. The gateway of claim 1, wherein a point in time for data transmission in the subsequent uplink interval is determined based on an index of an element included in the subsequent schedule information.

8. The gateway of claim 1, wherein the transmitter transmits to the sensor nodes a synchronization signal including the response data and the subsequent schedule information.

9. The gateway of claim 1, wherein the processor is further configured to:
   determine, based on cumulative data received from the sensor nodes after converting from a sleep mode to an active mode, whether the active mode is to be converted into the sleep mode,
   wherein the gateway operates in a low power mode in the sleep mode.

10. The gateway of claim 1, wherein the processor is further configured to allocate an element in the subsequent uplink interval to a sensor node selected based on at least one of a quantity of sensing data, whether data retransmission is required, and an amount of power consumption.

11. The gateway of claim 1, wherein the response data comprises an identical data structure irrespective of a number of sensor nodes allocated to the previous uplink interval.

12. The gateway of claim 1, wherein, in response to a data structure of the response data being related to a data structure of the previous schedule information, the response data comprises a small size bitmap.

13. A method of a gateway to communicate with sensor nodes, the method comprising:
   determining, with respect to a time slot included in a previous uplink interval, whether data is received from a sensor node corresponding to the time slot;
   generating, based on previous schedule information on the previous uplink interval, response data,
   wherein, upon determining that the data is received, the processor is configured to set a bit corresponding to the sensor node among a set of bits included in the response data to be a first logic value, and
   wherein, upon determining that the data is not received, the processor is configured to set the bit to be a second logic value;
   generating subsequent schedule information about a subsequent uplink interval, the subsequent schedule information comprising elements in the subsequent uplink interval allocated to the sensor nodes; and
   transmitting the response data and the subsequent schedule information to the sensor nodes,
   wherein the response data comprises the set of bits, each bit corresponding to a sensor node that transmitted data in the previous uplink interval.

* * * * *